INVENTORS
JOHN E. DUBIE
RONALD MORONEY
DEREK V. MANCINI
BY Fetherstonhaugh & Co.
ATTORNEYS

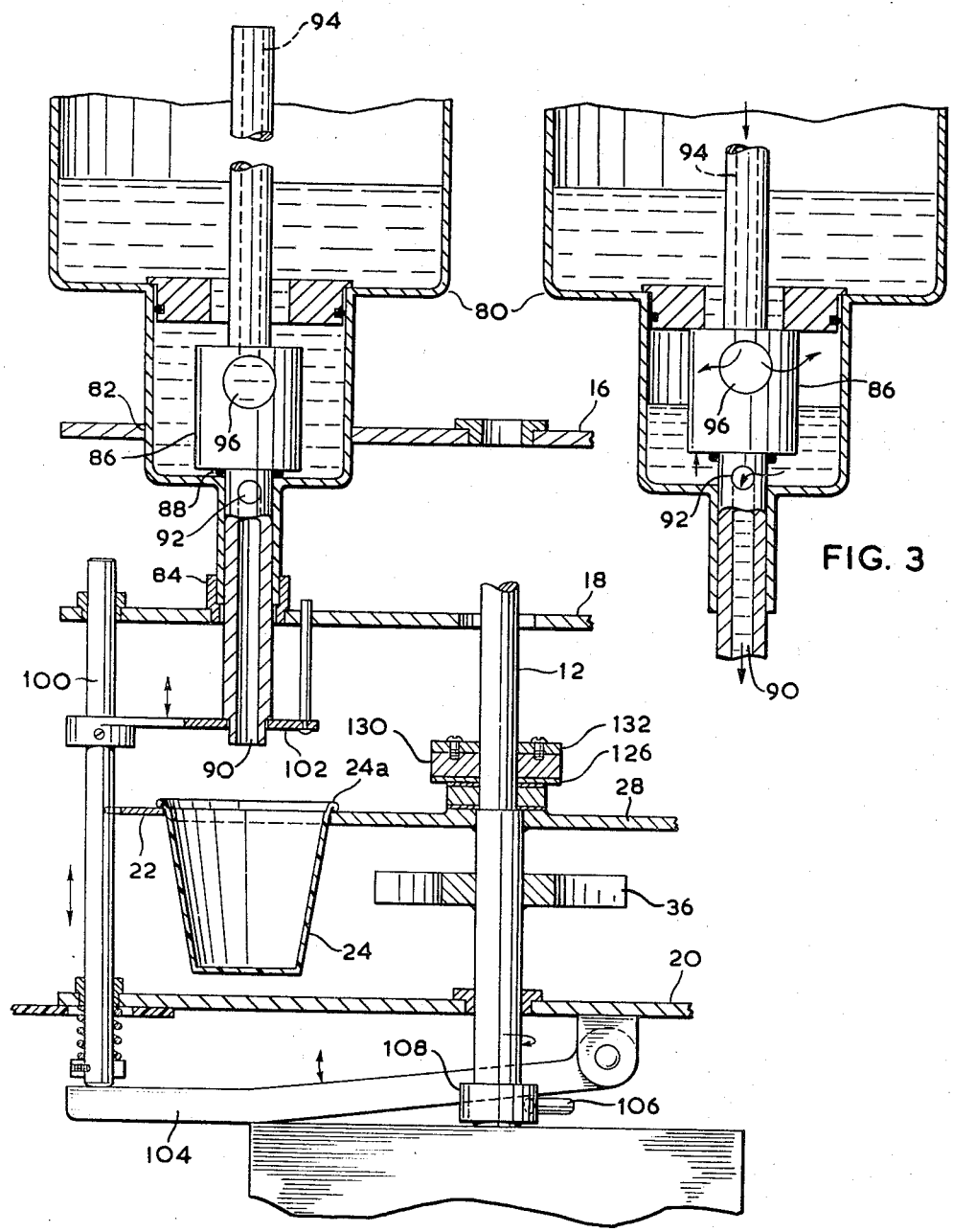

March 14, 1967 J. E. DUBIE ETAL 3,308,602
FLUIDS DISPENSER

Filed March 11, 1964 3 Sheets-Sheet 3

INVENTORS
JOHN E. DUBIE
RONALD MORONEY
DEREK V. MANCINI
BY Featherstonhaugh & Co.
ATTORNEYS 3,308,602
FLUIDS DISPENSER
John Elsworth Dubie, 100 Lawnside Drive; Ronald Moroney, 22 Elkhorn Drive, Apt. 104; and Derek V. Mancini, 418 Davisville Ave.; all of Toronto, Ontario, Canada
Filed Mar. 11, 1964, Ser. No. 351,135
Claims priority, application Great Britain, Mar. 12, 1963, 9,711/63
4 Claims. (Cl. 53—283)

This invention relates to dispensing machines, and is particularly concerned with a device for automatically filling, capping and dispensing small containers.

It is a primary object of the device in accord with this invention to fill, cap and dispense small creamers. The term "creamers" refers to small plastic or glass cups such as those commonly used in restaurants as a convenient method of passing out cream or milk in the serving of coffee and tea. However, it is to be understood that the device in accord with the invention is not restricted to use with creamers, as it will find broad utility in any operation involving filling, capping and dispensing of small containers.

As applied to the dispensing of creamers, the apparatus in accord with the invention is intended for use at the dispensing site, i.e., it is not meant to be used at the dairy or supplier of the cream, but on the premises serving the cream or milk, as the case may be. To this end, the apparatus is relatively simple in construction, as to be trouble-free and inexpensive to manufacture and maintain. Of equal importance is the compact size of the device, which is a particularly desirable feature from the point of view of the operator who must provide space for the device on his premises.

The device stores the fluid or other substance to be dispensed, as well as the creamers and caps, and fills, caps and dispenses the creamers as they are required. Thus, by way of example, if a waitress in a restaurant is required to fill an order for, say, two cups of coffee with cream, she simply operates the machine until two filled and capped creamers are delivered to her.

The apparatus in accord with the invention can be made in any suitable size, depending on the output required, and it fills a long-felt need for a simple compact device for filling and capping small containers such as creamers. Prior to the present invention, restaurants normally purchased creamers already filled and capped by their supplying dairy, or the creamers have been filled by hand as required.

Several filling, capping and dispensing machines are now available, but the prior devices are intended for high volume continuous operation. Examples of known machines are those used by bottling works. However, the prior machines all suffer the disadvantage that as they are designed for high volume continuous operation, the principles by which they work are not adaptable to small machines suitable for filling, capping and dispensing one container at a time, which is an essential requirement of a machine to be used in restaurants. Even more important, the known machines suffer the disadvantage that because they are intended for large volume production, the stations at which the containers are filled and at which they are dispensed from the machines are usually widely separated, so that when the machine is stopped, it usually holds one or more containers which are filled, but which are not delivered to the dispensing station. This is an unacceptable condition in a device intended for use in restaurants, as it would mean that filled containers would be held in the machine for some time prior to their being dispensed. For health reasons, it is undesirable that this condition be permitted to exist, as it is even possible that a filled creamer might be left in the machine overnight.

It is, therefore, a primary object of this invention to provide a compact relatively inexpensive device for filling, capping and dispensing small containers, such as creamers, which devices are particularly adapted to use in restaurants, cafeterias and the like.

It is a more specific object of the invention to provide a dispensing machine of this type, which is capable of economic operations, even through it is called upon to dispense small numbers of filled and capped containers at irregular intervals.

It is a further object of the invention to provide a dispensing machine which avoids the feature common to machines presently available, which results in the retention of one or more filled containers within the machine, when operation of the machine is stopped.

These and other objects of the invention will be more thoroughly understood from the following description of a preferred embodiment of the invention as read in conjunction with the accompanying drawings.

In the drawings:

FIGURE 1 is a perspective view of a filling, capping and dispensing device in accord with this preferred embodiment of the invention, certain parts of the device being omitted in the interest of clarity.

FIGURE 2 is an enlarged partially cross-sectional vertical view of a container filling mechanism which forms a part of the device illustrated in FIGURE 1, but which is omitted from FIGURE 1 in the interest of clarity, FIGURE 3 is a vertical cross-sectional view comparable to the top portion of FIGURE 2, and illustrating a second position of certain parts of the filling mechanism, as to illustrate the operation thereof.

Figure 1:
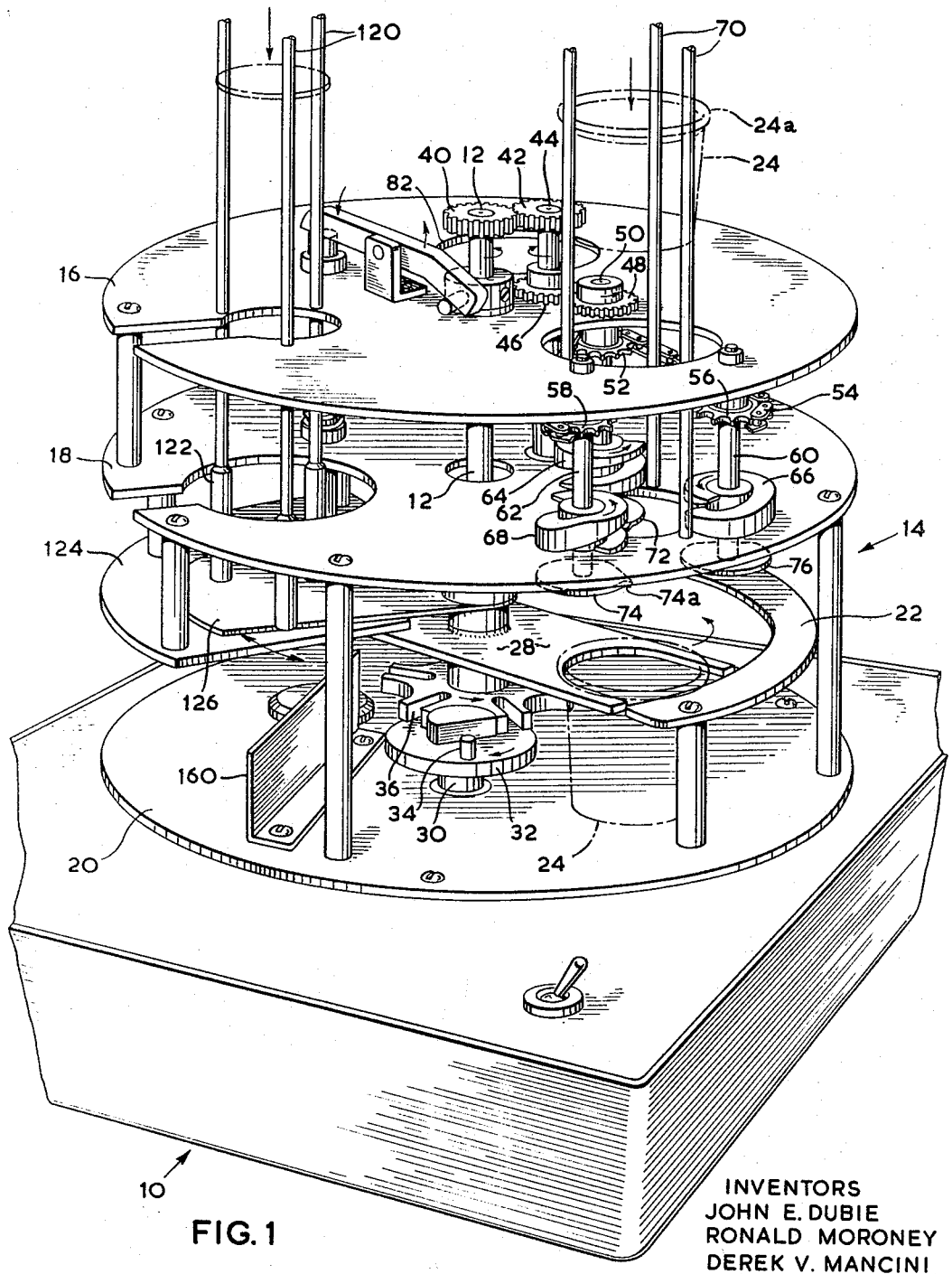

As stated above, it is a primary object of this invention to provide a relatively inexpensive and compact filling, capping and dispensing machine for small containers. To this end, the embodiment illustrated in FIGURE 1 has a base 10 approximately 12 x 8 inches in size. However, it will be appreciated that the dimensions stated are given only for the purpose of illustration, and the scope of the invention is not to be restricted thereto.

Contained within base 10 is an electric motor and reduction gear, appropriate lead in wires, and a switching device. The motor is connected through the reduction gear to a central vertical shaft 12, which is mounted for rotation within the frame of the device, which is generally indicated by the reference numeral 14. The frame essentially consists of three plates 16, 18 and 20, which are held in spaced apart relationship by a plurality of posts. The frame also includes a rail member 22, which serves as a guide for the containers 24, as the latter are carried from the container feeding station to the filling station to the capping station, and finally to the filled and capped container dispensing station.

The container dispensing, filling and capping mechanisms which are described in detail hereinafter, are all mechanically connected to central shaft 12, and are operated by rotation of the shaft. These connections are also described below.

Referring still to FIGURE 1, the reference numeral 28 indicates an index arm, which is mounted at its center on shaft 12. Index arm 28 is not keyed to shaft 12, and is, therefore, capable of rotating independently of, although coaxially with shaft 12. At its lower end within base 10, shaft 12 carries a gear which is engaged with a second gear connected to the lower end of a secondary shaft 30, whereby rotation of shaft 12 causes rotation of shaft 30. At its upper end, shaft 30 carries a disc 32, having an upstanding pin 34, which is adapted to engage a Geneva gear 36 fixed to a collar 38, which is in turn fixed to index arm 28. These components of the device act together in a known manner to intermittently rotate index arm 28.

Each end of index arm 28 is cut away as to provide a convenient form of container carrying means. When one end of index arm 28 is positioned beneath the container feeding mechanism, a container is dropped into the container carrying means associated with this particular end of the index arm.

As mentioned above, each of the container dispensing, filling and capping mechanisms is mechanically connected to central shaft 12, and are operated by rotation of this shaft. Thus, the container feeding mechanism is connected to shaft 12 through the intermeshed gears 40 and 42, with gear 40 fixed to the upper end of shaft 12 and gear 42 fixed to the upper end of a secondary shaft 44. A second gear 46 carried by shaft 44 is meshed with a gear 48 carried by a further secondary shaft 50. Shaft 50 carries a sprocket wheel 52 which engages a chain 54. The chain, in turn, engages sprockets wheels 56 and 58, carried by further shafts 60 and 62.

The three shafts 50, 60 and 62, carry large threaded members 64, 66 and 68 respectively. These members are adapted to engage the rims 24a of the containers 24, which are stored in a vertical nested array in a hopper, which conveniently takes the form of three vertical rods 70. The rods are fixed to plate 18, and are preferably held together at their upper end by an appropriate ring element (not shown).

As the three threaded members 64, 66 and 68 are rotated, they engage the rim 24a of the lowermost container in the hopper, and drop this lowermost container onto the three discs 72, 74 and 76, carried at the lower ends of idler shafts 50, 62 and 60. These discs catch the undersides of rims 24a, and suspend the container caught in this manner, as the discs rotate, until the latter rotate a sufficient degree to bring the downwardly bent portions thereof (only one of which can be seen in FIGURE 1, namely bent portion 74a) under the rim 24a, at which time the container is dropped from engagement with the discs into the container carrying means of the index arm. It can be seen, therefore, that stemming from the continuous rotation of central shaft 12, the container feeding mechanism operates to drop containers at regularly timed intervals into the container carrying means at each end of index arm 28. The only adjustment required to insure the proper timing of the container feeding mechanism is an adjustment of the discs 72, 74 and 76, to insure that containers held by these discs 72, 74 and 76 are dropped only when one end of index arm 28 is positioned directly beneath the container hopper.

The container filler mechanism is not shown in FIGURE 1, and in order to describe the construction and operation of this mechanism, reference is made to FIGURES 2 and 3. The filler mechanism essentially consists of a hopper for the cream or other liquid with which the containers are to be filled, and an arrangement for metering liquid from the hopper into the containers.

Referring to FIGURE 2, the hopper is indicated by the reference numeral 80, and is preferably made of stainless steel or like material, which can be readily cleaned. The hopper is removable from the device so that it may be carried to the washing area of the restaurant or cafeteria concerned. It is held in the device by being received in an aperture 82 in top plate 16, and by being received in a bushing 84, mounted in an aperture in the middle plate 18. The hopper holds a liquid metering plunger 86, which is adapted for vertical reciprocation. Member 86 is provided with an O ring 88, which acts as a valve to prevent the downward flow of liquid from the hopper when the member 86 is in the position shown in FIGURE 2. As member 86 is raised to the position shown in FIGURE 3, in the manner described hereinafter, it seals against the underside of ring 89 as to close the lower end of the hopper from the upper end, after which liquid contained in the lower end drains down through the central vertical bore 90, after entering therein through the aperture 92, and drops into the container 24 carried at the end of the index arm 28. To insure this draining of the lower end of the hopper, the top portion of member 86 is vertically bored at 94, and is apertured at 96, whereby air can enter the lower end of the hopper so as to avoid build up of a vacuum in the lower end of the hopper, which might tend to prevent drainage thereof.

As can be appreciated from the above description of the fluid metering device, fluid flows only so long as member 86 is held in the upper position shown in FIGURE 3. The mechanism provided for raising member 86 consists of a spring-biased reciprocating rod 100, an arm URE 3. The mechanism provided for raising member 86 and lever arm 104, which is pivotally suspended from plate 20 and which is raised at regular timed intervals by a pin 106 projecting from collar 108 carried by shaft 12. As the shaft rotates, pin 106 raises arm 104, which, in turn, raises rod 100 and through the arm 102 raises member 86.

By adjusting the position of collar 108 on shaft 12, it is possible to insure that the liquid metering device operates only when one end of index arm 28 is positioned beneath the container filling mechanism. It will be further appreciated that the amount of liquid delivered to the containers is also readily adjustable by adjusting the length of time member 86 is held in the raised position.

Figure 4:
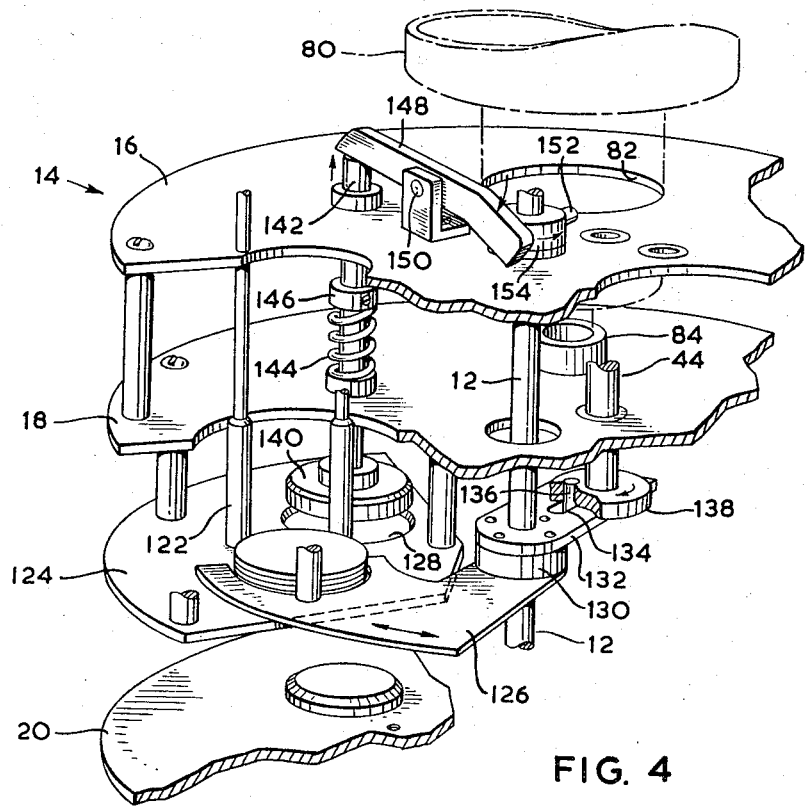
FIGURE 4 is an enlarged view of a portion of the device illustrated in FIGURE 1, and particularly illustrates the capping mechanism portion thereof.
Figure 5:
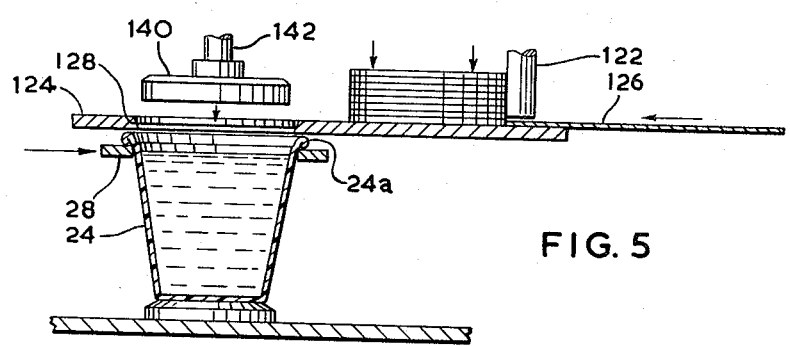
FIGURE 5 is an enlarged vertical cross-sectional view of certain parts of the capping mechanism illustrated in FIGURE 4.

The mechanism for capping the filled containers is illustrated in FIGURES 4 and 5, and to some degree in FIGURE 1. Referring to FIGURE 1, it is to be noted that the caps are stacked vertically in a hopper which, as in the case of the container hopper, may conveniently take the form of three rods 120. In practice, the caps would be conveniently stored in a cardboard tube which would be held within the hopper, and whose lower end would be positioned at the tops of the enlarged portions 122 at the lower ends of rods 120. It is to be noted that the lower ends of rods 120 terminate above the plane of the plate 124, as to permit the back and forth movement of a cap moving arm 126. This moving arm or plate 126 is caused to move through an arc on the top surface of plate 124, as to carry caps as they drop by gravity onto plate 124, to an aperture 128 in plate 124. Arm 126 is cut away at its forward end as to allow the lower most cap in the stack to drop onto the top surface of plate 124, and as arm 126 moves away from the lower end of the cap hopper, the lower ends 122 of rods 120 prevent all but the lowermost cap from moving. Arm 126 is so dimensioned that as the lowermost cap is carried to aperture 128, the next lowermost cap rides on the top surface of arm 126, so that it is not pushed backward when the arm returns to the position shown in FIGURE 4.

It will be noted that the inner end of arm 126 is fixed to a collar 130, which is freely mounted on central shaft 12. Fixed to collar 130 is a second arm 132, having a longitudinally extending slot 134. A pin 136 is engaged in this slot with the pin being carried by a disc 138 fixed to the lower end of an idler shaft 140. A gear (not shown) is carried at the top end of shaft 140, and this gear is meshed with a similar gear (also not shown) fixed to shaft 12 immediately beneath the plate 16. Thus, as shaft 12 rotates, shaft 140 is rotated and this causes the desired back and forth arc movement of plate 126. Thus, as shaft 12 continuously rotates, plate 126 automatically and regularly feeds caps from the lower end of the stack of caps within the cap hopper to the aperture 128 in plate 124.

Referring now to FIGURE 5, it will be noted that aperture 128 is shaped as to converge downwardly. This is an important feature of the invention. The lower end of aperture 128 is made just slightly smaller in diameter than the caps, so that the caps are held by the aperture ready for downward movement into the container through the action of the plunger 140. Due to the resiliency of the cap material, the plunger can force the caps through the aperture and into the upper ends of the containers. While there are many known capping devices which employ vertically reciprocating plungers, the prior devices have employed complicated movable fingers and the like for holding the caps in position for the plunging operation. By the simple expedient of the converging aperture 128, these complicated movable finger arrangements are avoided.

The plunger 140 is carried at the lowered of a reciprocating rod 142, which carries a spring 144, bearing against the top surface of plate 18 and against a collar 146, fixed to the rod, whereby the rod is normally biased upwardly. The top end of the rod projects upwardly through plate 16 and a lever 148 is caused to rock about its pivot point 150 by a pin 152 fixed to a collar 154, which is, in turn, fixed to shaft 12. Thus, as shaft 12 rotates continuously, pin 150 causes plunger 140 to reciprocate at regular timed intervals. The timing of the operation of the plunger can be readily adjusted by adjusting the position of collar 154 on shaft 12.

Referring again to FIGURE 1, it will be noted that a vertical guide plate 160 is fixed to plate 20. Plate 160 is so arranged as to push filled and capped containers from the ends of index arm 28 as these ends move past the plate 160. This is a preferable feature, but not essential, as the dispensing station of the machine could simply consist of a stopped position of index arm 128, whereby the operator could manually remove the filled and capped containers from the index arm.

As is apparent from the above description of the device, each of the container dispensing, filling and capping mechanisms are mechanically connected to central shaft 12 and are operated by rotation of this shaft. It is also apparent that the relative timing of the operation of each of these mechanisms is readily adjustable by adjusting collars on shaft 12 or by other equally simple expedients.

As it is a primary object of the device is accord with this invention to avoid retention of a filled container within the machine when operation of the machine has been stopped, it is important to note the relative positions of the filling station and the final dispensing station. In this regard, it is to be noted that a container carried at one end of the index arm is not filled with liquid until the opposite end of the index arm has moved past the dispensing station. The device is provided with a switching arrangement which stops operation of the device only upon the arrival of one end of the index arm at the dispensing station. It is not possible, therefore, to have a container filled but not dispensed. It is only following the movement of one end of the index arm past the dispensing station, that the filling mechanism operates to fill a container carried at the opposite end of the index arm. This switching arrangement consists of a manually operated master switch and a cam operated secondary switch, both of which must be closed before current to the motor rotating the shaft is cut off. The shaft is provided with a cam which closes the secondary switch when one end of the index arm arrives at the dispensing station. As long as the master switch is left open, however, closure of the secondary switch does not stop the device so that it can be operated continuously. To stop the device, the master switch is closed and current to the motor is interrupted upon closure of the secondary switch as one end of the index arm arrives at the dispensing station. Thus, while the switching arrangement permits continuous operation of the machine, it is a feature of this device that when the master switch is closed, the device does not actually stop operation until one end of the index arm has moved into the dispensing station. Thus, as the filling mechanism does not operate to fill a container carried at one end of the index arm until the opposite end of the index arm moves past this final dispensing station, it is not possible to have a filled container in the device when it has ceased operation.

What we claim as our invention is:

1. A device for filling, capping and dispensing containers, said device comprising a frame, a central, rotatable, vertical shaft mounted within said frame, means for rotating said shaft, a rotatable index arm freely mounted at its center on said shaft, means for intermittently rotating said index arm, power transmitting means interconnecting said arm rotating means and said shaft whereby said arm rotating means is operated by rotation of said shaft, container carrying means carried at each end of said index arm, a container feeding station at which a container is fed to one of said container carrying means when one end of said index arm is stopped at said container feeding station, a container filling station at which a measured quantity of liquid is fed to a container carried by one of said container carrying means when one end of said index arm is stopped at said container filling station, a capping station at which a filled container carried by said container carrying means is capped when one end of said index arm is stopped at said capping station, and a dispensing station at which a filled and capped container is dispensed from the device when one end of said index arm is stopped at said dispensing station, a container feeding mechanism, a filling mechanism and a capping mechanism positioned at said container feeding, filling and capping stations, respectively, separate power transmitting means connecting each of said mechanisms to said shaft whereby they are operated by the rotation of the shaft, means for controlling said shaft rotating means so that said device ceases operation only when one end of said index arm is at said container dispensing station, said filling station being positioned relative to said dispensing station so that liquid is fed to a container carried at one end of said index arm only after the opposite end of said index arm passes said dispensing station whereby said device does not cease operation with a container filled but not delivered to said dispensing station.

2. A device as claimed in claim 1, in which said means for rotating said shaft includes an electric motor, said means for controlling said shaft rotating means comprising a switching arrangement having a manually operated master switch and a cam operated secondary switch, closure of both said switches being required to interrupt current flow to said motor, and a cam fixed to said shaft, said cam being positioned on said shaft whereby said secondary switch is closed only when one end of said index arm is at said dispensing station.

3. A device as claimed in claim 1, in which each of said power transmitting means includes adjustment means whereby timing of the operation of said index arm and said container feeding, filling and capping mechanisms may be adjusted.

4. A device as claimed in claim 1, in which said means for rotating said shaft includes an electric motor, said means for controlling said shaft rotating means comprising a switching arrangement having a manually operated master switch and a cam operated secondary switch, closure of both said switches being required to interrupt current flow to said motor, and a cam fixed to said shaft, said cam being positioned on said shaft whereby said secondary switch is closed only when one end of said index arm is at said dispensing station, said power transmitting means each including adjustment means whereby timing of the operation of said index arm, and said container feeding, filling and capping mechanisms may be adjusted.

References Cited by the Examiner

UNITED STATES PATENTS

| 2,969,632 | 1/1961 | Carew et al. | 53—283 |
| 3,238,699 | 3/1966 | Morton | 53—281 X |

TRAVIS S. McGEHEE, *Primary Examiner.*

R. L. FARRIS, *Assistant Examiner.*